FIG.1.

May 21, 1957 E. C. RHYNE, JR 2,793,338
SYSTEM FOR CONTROLLING INDUCTION MOTORS BY SATURABLE
REACTORS AND COORDINATELY CONTROLLED RESISTORS
Filed Dec. 22, 1955 6 Sheets-Sheet 2

United States Patent Office 2,793,338
Patented May 21, 1957

2,793,338

SYSTEM FOR CONTROLLING INDUCTION MOTORS BY SATURABLE REACTORS AND COORDINATELY CONTROLLED RESISTORS

Earl C. Rhyne, Jr., East Pepperell, Mass., assignor to Cline Electric Manufacturing Company, Chicago, Ill., a corporation of Delaware Application December 22, 1955, Serial No. 554,865

16 Claims. (Cl. 318—214)

My invention relates to systems for controlling the speed of an induction motor by means of variable inductive impedance devices of the magnetically saturable type which are connected in series with the motor primary circuit, or which, in the case of a wound-rotor motor, are connected in the secondary circuit. In a more particular aspect, the invention concerns systems of the type just mentioned in which the current-controlling inductance devices consist of saturable-core reactors or are formed by the saturable reactors of a magnetic amplifier.

While the provision of such variable reactor devices in series with the stator or rotor affords controlling the speed of an alternating-current induction motor by a continuous, condition-responsive impedance regulation so as to maintain a desired subsynchronous speed, a problem important for securing satisfactory performance in such systems is the prevention of excessive heating in the motor.

When an induction motor is controlled and regulated for subsynchronous speed, part of the wattage supplied to the motor must be dissipated in the electric system. For example, when the speed of the motor is reduced to 50% of synchronous speed, thus operating with a slip of 0.5, there is as much power dissipated in the rotor circuit as there is power transmitted through the shaft. In systems which control the motor speed by means of ohmic resistors in the external rotor circuit, most of the dissipated wattage appears as heat in the external resistors; and the motor will not overheat during normal operation, that is, as long as it does not carry an excessive load considerably beyond the rated value. This is not so in systems operating with saturable reactors or other inductive impedance devices in the primary or secondary motor circuit. In such reactor-type systems, there is danger of overheating of the motor during normal operation at subsynchronous speeds even in the absence of excessive load, unless particular expedients are resorted to.

One of the conventional expedients is to use a standard motor of a size larger than normal for the particular power requirements. Another possibility of preventing overheating would be to use a motor adapted for special cooling such as by high-pressure air circulation or water circulation. All of these expedients demand undesirably large space, not only for the motor itself but also for the correspondingly large reactors and other components of the control system.

It is, therefore, an object of my invention to devise a control system, generally of the saturable inductance type, that for given power requirements can be given a smaller size of the system components.

More specifically, it is an object to improve motor control systems of the saturable reactor type by minimizing the heating in the induction motor, thus permitting the use of a smaller motor than heretofore necessary for given power requirements.

Another object of the invention is to minimize the current-carrying capacity of the series reactors to permit reducing their size and weight.

To achieve these objects as well as the further objects and advantages mentioned below, and in accordance with one of the features of my invention, I not only connect a controllable inductive impedance device, preferably a saturable reactor device, in series with the induction motor to be speed-controlled, but I also provide the rotor circuit of the motor with continuously variable ohmic resistance means and control the resistance in dependence upon the speed setting of the control system so that any increase or decrease in motor speed under control by the reactor device is correlated to a resistance decrease or increase, respectively, in the secondary motor circuit, the correlation being such that, for any selected and regulated speed of the motor, the resistance of the rotor circuit is always just small enough for permitting the rotor to develop slightly more than its rated torque when the inductive regulator is at minimum impedance, i. e. when the iron cores of the saturable reactor device are fully saturated.

More specifically, the adjustable resistance in the rotor circuit is so rated and calibrated that its value, for any selected speed setting of the control system, is almost but not quite equal to the upper limit value R as expressed in the equation:

$$R = \frac{\left[\frac{N}{N_s} - \left(\frac{N}{N_s}\right)^2\right] E_b{}^2}{P_o}$$

wherein $N_s$ is the synchronous speed in R. P. M., $N$ is the actual speed in R. P. M. as determined by the selected speed setting of the impedance control system, $P_o$ is the rated maximum power output in watts, and $E_b$ is the blocked-rotor voltage.

Under these conditions, the internal wattages of the motor are always maintained within rated limits, as just enough power is now dissipated by the adjusted resistor means in the rotor circuit. Hence, the motor current does not exceed the rated value, and the motor resistance losses are not excessive. The resulting reduction in heating permits the use of a smaller motor than otherwise required. The full-load power factor of the system is improved. The current required from the power supply is reduced. The current-carrying capacity of the inductance device or saturable reactor device is smaller, thus affording a reduction in size and weight of this device. This, in consequence, results in smaller components in the reactance control circuits and thus further contributes to reducing the space requirements and weight of the over-all system. Since, further, the volt-amperes of the motor are resistive to a larger extent, the system is capable of developing full torque in the drive motor regardless of the unsaturable reactive component of the saturable-core reactor device.

The continuously variable ohmic resistance in the rotor circuit may consist of a wound rheostat or other device in which the change in resistance does not occur strictly continuously but rather in slight increments, provided such increments are small enough to be negligible in the sense that any change in speed setting of the impedance control system is accompanied by a corresponding change in rotor-circuit resistance and that the resistance value, at any point of the entire speed range available, stays below the value R within a permissible range of departure of, for instance, about 5% to about 15%.

According to another feature of my invention, applicable with wound-rotor motor in cases where the motor is not called upon to operate below a known minimum torque, I locate not only the correlated resistance means but also the saturable reactor device in the secondary circuit of the motor and connect with the same circuit another adjustable resistance component in shunt relation to the series-connection of the saturable reactor device and the afore-mentioned resistance means. The shunt-connected resistance component thus relieves the saturable reactor device of a share of the current-carrying duty, and this share is adjusted for each speed setting of the system by correlating the adjustment of the shunt resistance means with the above-described resistance setting of the first-mentioned resistance means.

The above-mentioned and other objects, features and advantages will be apparent from the following detailed description of the embodiments of systems according to the invention shown by way of example on the accompanying drawings, in which—

Figure 1:
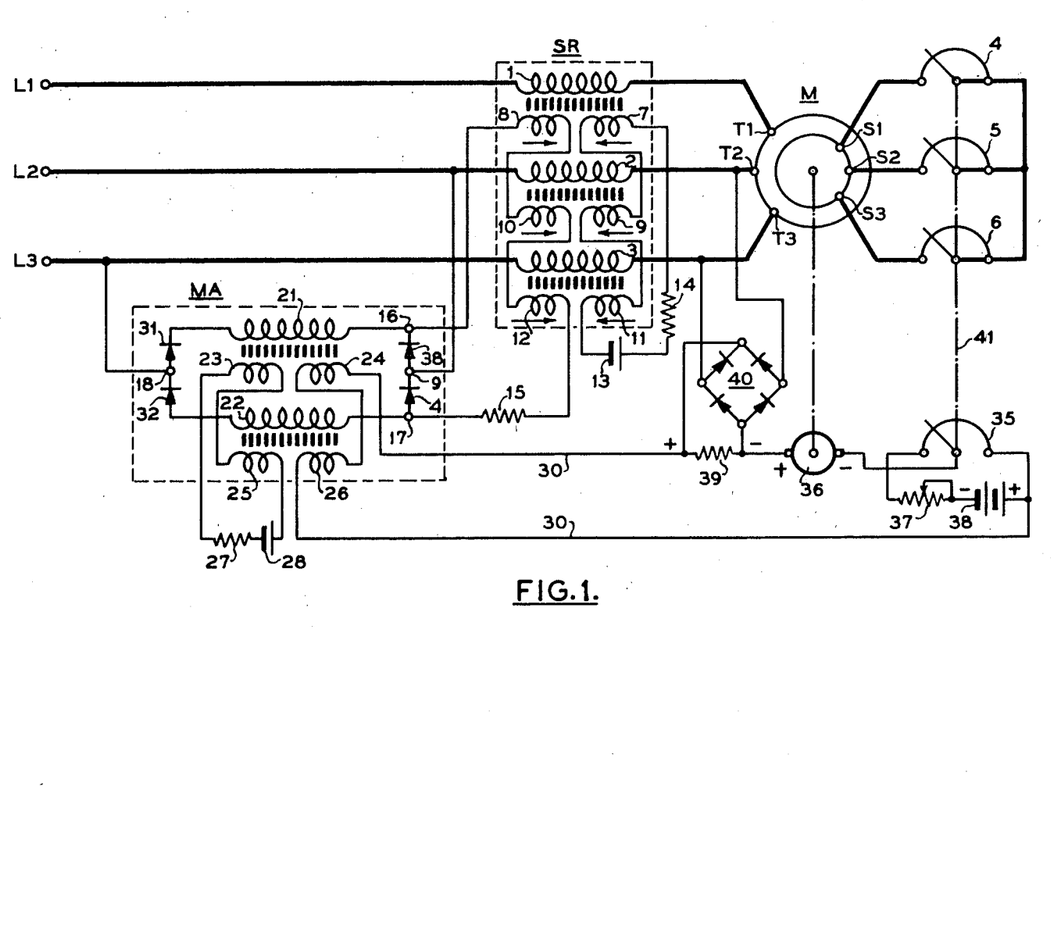
Fig. 1 is a schematic circuit diagram of an induction motor control system having saturable reactors connected in the stator circuit.

In the system according to Fig. 1, the primary terminals T1, T2, T3 of a wound-rotor motor M to be controlled are connected with the terminals or buses L1, L2, L3 of a three-phase alternating-current supply line through the main windings 1, 2, 3 of three saturable reactors which together form a saturable reactor device SR. The secondary terminals S1, S2, S3 of motor M are connected to an exterior rotor circuit which comprises three adjustable resistors 4, 5, 6 in the respective phases of the rotor circuit.

Each of the three reactors in device SR has its saturable iron core provided with two premagnetizing coils, 7 and 8, 9 and 10, or 11 and 12. The coils 8, 10 and 12 merely serve to provide a constant negative bias and are energized from a source of constant voltage 13 through a calibrating and current-limiting resistor 14. The coils 7, 9 and 11 are connected in the control circuit of the reactor device SR. The control circuit is energized through a resistor 15 from across the direct-current output terminals 16 and 17 of an amplifier MA energized at its power input terminals 18 and 19 from across line terminals L3 and L2.

When control current flows through the saturation control coils 7, 9, 11, the reactors are saturated to an extent determined by the magnitude of the control current. In turn, a power current flows through the main windings 1, 2, 3 of the saturable reactor device and has a magnitude determined by the degree of saturation of the reactor iron cores. Consequently, by proper control of the current passing from amplifier MA through the control windings 7, 9, 11, the supply of power to the motor and the magnitude of the stator voltage impressed upon the primary terminals T1, T2, T3 can be controlled and regulated to accomplish the desired speed control.

The amplifier MA used in the embodiment of Fig. 1 is of the magnetic type. It comprises two saturable reactors having respective alternating-current windings 21 and 22. The saturable core of each winding carries two premagnetizing coils 23 and 24, or 25 and 26. The purpose of coils 23 and 25 is to supply constant premagnetizing bias. Accordingly, these coils are energized through a calibrating resistor 27 from a source 28 of constant voltage.

The coils 24 and 26 form part of the control or signal circuit 30 of amplifier MA. This control circuit is supplied with variable voltage and thus drives a correspondingly variable current through the coils 24 and 26 with the effect of proportionately controlling the output current of amplifier MA. The amplifier further comprises four individual rectifier units 31, 32, 33, 34 connected in series with the reactor main windings 21 and 22 to form a rectifying bridge network, so that amplified and rectified current is available at the amplifier output terminals 16 and 17.

The amplifier control circuit 30 comprises two main sources of component control voltages poled in series opposition to each other. One of these sources is constituted by the tapped-off portion of a potentiometer rheostat 35 which forms the speed-control rheostat of the system. The second source is formed by a tachometer generator 36 which is driven from the motor M and generates a voltage proportional to the motor speed. The potentiometer rheostat 35 is energized through a calibrating resistor 37 of normally fixed adjustment from a suitable source 38 of constant direct voltage. Consequently, the voltage drop across the effective portion of potentiometer 35 is dependent upon the selected setting of its slider and acts in opposition to the variable signal voltage supplied by the tachometer 36. The control circuit 30 is further shown equipped with a series-connected resistor 39 energized from the output terminals of a rectifier 40 that receives alternating voltage from across the primary motor terminals T2, T3. Resistor 39 additionally impresses upon control circuit 30 a corrective feed-back voltage proportional to the stator voltage of the motor for stabilizing the regulating performance of the system.

The control system operates to regulate the stator voltage of the motor to maintain the motor speed at a desired value corresponding to the selected setting of potentiometer 35. When the slide contact is turned fully to the left so that the reference voltage across potentiometer 35 is a maximum, the motor must run at its highest speed in order to cause the tachometer 36 to generate a signal voltage approximately equal to the reference voltage. When the slider is set entirely to the right, the reference voltage is zero and the motor M will run at minimum speed or will stop. The speed at which the motor will run is the one at which the tachometer generator 36 produces a voltage slightly smaller than the reference voltage of potentiometer 35 by an amount equal to the sum of the slight corrective voltage appearing across resistor 39 plus the voltage drop across the control windings 24 and 26 of the magnetic amplifier MA.

When motor M runs at a speed lower than the speed called for by the setting of control potentiometer 35, a current flows in control circuit 30 through the amplifier control windings 24, 26 and results in increased saturation of the iron cores in the amplifier. This, in turn, causes an amplified alternating current to flow through windings 21, 22 which passes as a rectified output current between the amplifier output terminals 16 and 17 through the control windings 7, 9, 11 of the reactor device SR. This increases the degree of saturation in the reactor iron of device SR and permits a correspondingly large current to flow through the main windings 1, 2, 3 and through the motor. Approximately full voltage may then appear at the motor primary terminals T1, T2, T3 with the effect of accelerating the motor.

When the motor runs faster than the speed called for by the reference voltage across the active portion of control potentiometer 35, the tachometer voltage is greater than the reference voltage and a current will now flow through the control windings 24, 26 of the magnetic amplifier MA in the opposite direction, so that the degree of saturation of the reactor iron in the magnetic amplifier decreases. Consequently, now only a very small current flows from the magnetic amplifier through the control windings 7, 9, 11 of the saturable reactor device SR. Under these conditions, the device SR permits only a reduced current flow to the motor, and the voltage impressed upon the primary terminals T1, T2 and T3 of motor M is small. The motor slows down.

The effect of rectifier 40 and resistor 39 is such as to attempt maintaining the primary terminal voltage of the motor constant, although in operation this effect is overpowered by the action of the tachometer generator 36 and the reference voltage from control potentiometer 35. Nevertheless, by tending to control the motor toward constancy of primary terminal voltage, the voltage drop appearing across resistor 39 helps prevent the occurrence of oscillation or hunting in motor speed.

As explained above, in a system of the type illustrated in Fig. 1, there is for each value of adjusted reference voltage or for each speed of the motor M, a most desirable value of resistance in the rotor circuit, determined by the above-presented equation, at which the heating occurring in the motor is a minimum. As explained, this resistance value, adjustable by means of resistors 4, 5 and 6, is to be kept just small enough to permit the motor to develop slightly more than its rated torque when the saturable reactor device SR is fully saturated and hence operates at a minimum of effective impedance.

In order to secure such a correlation in adjustment of the resistors 4, 5, 6 relative to the speed-control potentiometer 35, the resistors and the slider of the control potentiometer are linked together mechanically or by any other suitable means, the linking connection being schematically indicated in Fig. 1 by a dot-and-dash line 41. The connection is such that with an increase in reference voltage, corresponding to a setting of control potentiometer 35 toward greater motor speed, the effective resistance of resistors 4, 5 and 6 in series with the rotor circuit is reduced at the proper rate.

Figure 2:
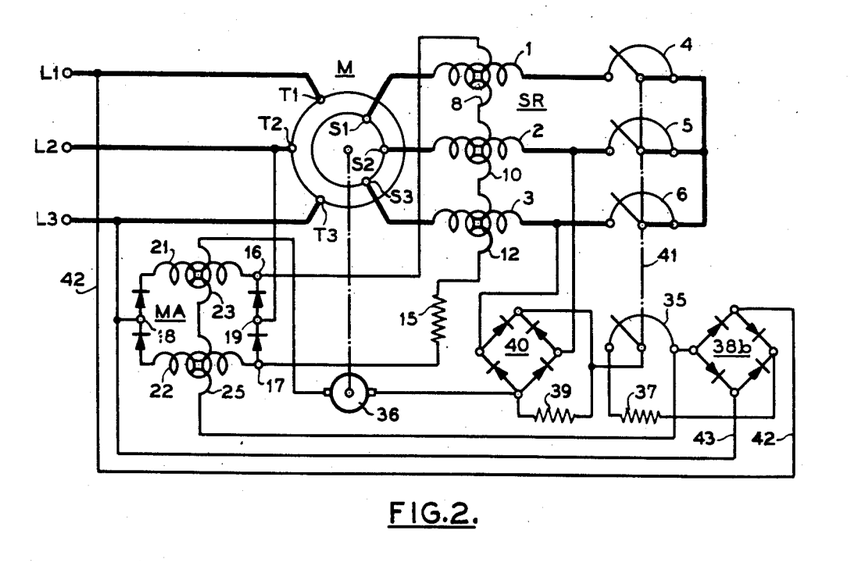
Fig. 2 shows a similar motor control system having the saturable reactors connected in the rotor circuit.

The speed control system illustrated in Fig. 2 is largely similar to the system of Fig. 1, as is apparent from the use of identical reference characters in both illustrations for respectively similar components. The illustration in Fig. 2 is simplified by a more symbolic showing of the saturable reactors in device SR and amplifier MA, and also by the omission of the constant-bias premagnetizing circuits conventionally used in such systems but not essential to the invention proper. The essential difference between the two systems lies in the fact that in the system of Fig. 2, the main windings 1, 2, 3 of the saturable reactor device SR are connected in the external rotor circuit of the wound-rotor motor, namely in series between the secondary terminals S1, S2, S3 and the respective resistors 4, 5 and 6. A minor difference relates to the constant-voltage energization applied across the speed-control potentiometer 35. According to Fig. 2, this energization is supplied from the direct-current output terminals of a rectifier 38b whose input terminals are connected by alternating-current leads 42, 43 across line terminals L1, L3.

In a system according to Fig. 2, as compared with a system shown in Fig. 1, the speed of the motor is controlled, not by varying the primary terminal voltage and the supply of power to the motor but rather by varying the impedance loading of the secondary circuit. This has the advantage that the saturable reactors of impedance control device SR can be made smaller because the reactor device does not have to conduct the magnetizing current for the stator.

Otherwise, the control and regulating performance of the system shown in Fig. 2 is as described above with reference to Fig. 1. It will be noted that the slider of speed-control potentiometer 35 in Fig. 2 is linked together with the sliders of resistors 4, 5 and 6, so that any change in speed setting of potentiometer 35 causes simultaneously a proper resistance adjustment in the rotor circuit.

Figure 3:
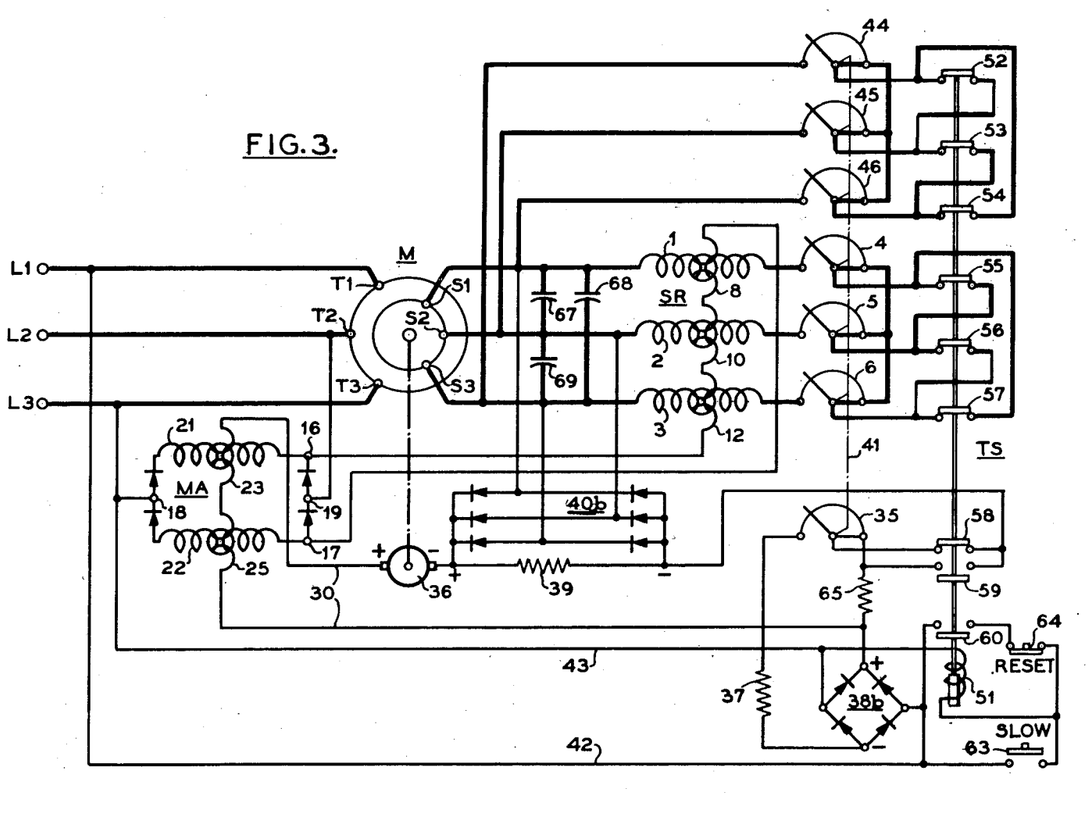
Fig. 3 is a schematic circuit diagram of a motor control system whose rotor circuit is equipped with controllable resistors in series with saturable reactors and further resistors in parallel with the reactors.

The motor control system illustrated in Fig. 3 is similar, to a large extent, to the system described above, and therefore will be described mainly as regards it distinctive features in comparison with the system of Fig. 2.

One of these salient features in Fig. 3 is the provision of adjustable resistors 44, 45 and 46, which are connected with the respective secondary terminals S1, S2, S3 of the motor in shunt relation to the series connection of the reactor main windings 1, 2, 3 with the resistors 4, 5 and 6. The resistors 44, 45, 46 thus can carry a portion of the rotor load current, which portion does not pass through the reactor windings 1, 2 and 3. Such shunt resistors are applicable only for purposes where a known minimum torque condition exists in the load, since the saturable reactor windings 1, 2, 3 can no longer reduce the motor torque to values lower than the torque obtained by the effect of the resistors 44, 45, 46. Such conditions exist, for instance, in drives for printing presses and drives for other web material which always involve a given minimum load due to friction and windage losses.

In order to have the shunt resistors 44, 45, 46 operate to reduce the current-carrying capacity of the saturable reactor device SR regardless of the particular speed conditions to which the motor may be set, the resistance of resistors 44, 45, 46 must be varied in dependence upon the variation of the resistors 4, 5, 6, because for each particular speed setting, the desired resistance value must be secured for each of the six resistors connected to the motor secondary terminals. This desired resistance value is such that it permits a slightly lower than the minimum torque to be developed through the action of resistors 44, 45, 46 when minimum load current is flowing through the main windings 1, 2, 3 of the saturable reactor device SR.

The adjustment of resistors 44, 45 and 46 is preferably effected simultaneously with that of the resistors 4, 5, 6. For that purpose, the slide contacts of resistors 44, 45, 46 are joined, for instance mechanically, with the same connection 41 that also controls the setting of resistors 4, 5, 6 in dependence upon the selected adjustment of the speed control potentiometer 35.

Another distinctive feature embodied in the system of Fig. 3 is a trip-slow device which permits setting the drive system for operation of the motor at a predetermined minimum speed as desired for inching or threading operations. This device is essentially a switch, which, when effective, places full secondary resistance into the rotor circuit, or increases the secondary resistance to a pre-set value at which the motor will run at the desired slow speed.

In the embodiment shown in Fig. 3, the trip-slow switching device is formed by a contactor TS whose control coil 51 actuates normally-closed contacts 52 to 57, each connected in parallel relation to a portion of the respective resistors. It will be recognized that, for instance, the contact 52 normally shorts a portion of resistor 44 depending on the position of the slider, so that, under normal operating conditions, only the remaining tapped-off portion of resistor 44 is effective in the secondary circuit of the motor. Contactor TS is further provided with control contacts 58 to 60.

The contactor TS is controlled by a normally open push-button switch 63, which, when being depressed, energizes the contactor coil 51 from leads 42 and 43. Contactor TS then picks up and opens its main contacts 52 to 57 while closing a self-holding contact 60 which is parallel connected to push-button contact 63 through a normally closed "reset" push-button contact 64. Consequently, the contactor TS will stay picked up after the contact 63 is released by the operator, and will thereafter drop out only when the push button 64 is actuated. In the normal operating condition of the drive, with contact 63 open and contact 64 closed, the system will operate at a selected speed as set by the speed control potentiometer 35; and this speed is then controlled and regulated in the same manner as explained above with reference to Figs. 1 and 2. Upon actuation of the "slow" button 63, however, the contactor TS puts the full resistance of resistors 4, 5, 6, 44, 45, 46 into operation, thus setting the rotor circuit for slow speed. At the same time, the control contact 58 disconnects the speed-control potentiometer 35 from the amplifier control circuit 30, and the control contact recloses this circuit through a resistor 65 which is connected in series with potentiometer 35 in the constant-voltage supply circuit energized from rectifier 38b. The resistance value of resistor 65, compared with the total resistance of the speed-control potentiometer 35, is small and is so chosen that the voltage drop across resistor 65 has the small value required for setting the control system for creeping or threading speed. Consequently, the drive system now operates at minimum speed until the "reset" button 64 is depressed. This returns the system to the normal control and regulating conditions subject to the setting of control potentiometer 35.

The system shown in Fig. 3 is further equipped with capacitors 67, 68, 69, each connected across one of the respective phases of the secondary circuit. These capacitors, especially at high values of slip and hence at low subsynchronous speeds, improve the power factor of the system. This also tends to minimize the flow of excessive currents in the motor.

Figure 4:
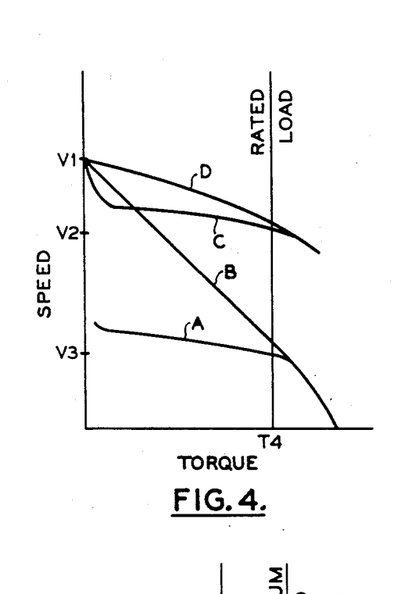
Figs. 4 to 6 are explanatory speed-torque diagrams relating to the performance of control systems according to the invention.
Figure 5:
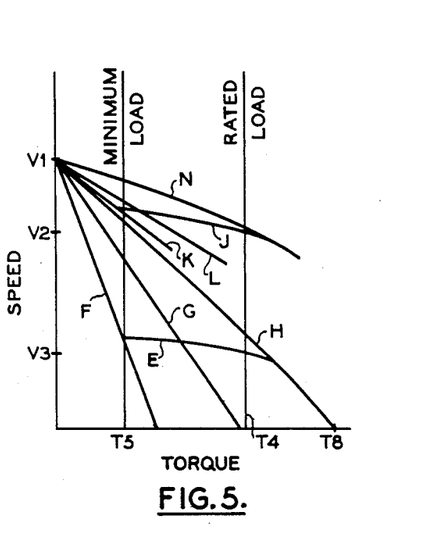
Figure 6:
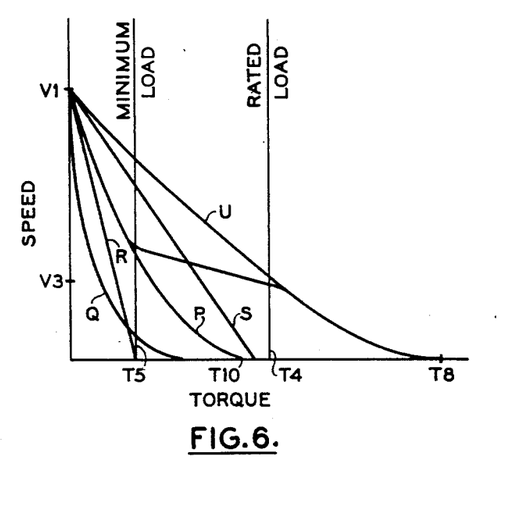

The performance of a drive system according to the invention will be more fully understood from the speed-torque characteristics shown in Figs. 4, 5 and 6. Fig. 4 illustrates a set of speed-torque curves applicable to systems according to Figs. 1 and 2. When the reference voltage is set for a low speed V3, the speed-torque performance is comparable to that shown by curve A in Fig. 4. The effect of resistors 4, 5, 6 for this speed condition results in a curve comparable to curve B in Fig. 4 under the condition of full saturation of saturable reactor device SR. It can be seen that the resistance is just small enough to permit the motor to develop full rated torque T4 when the reactor device SR is essentially saturated. When the reference voltage is set for a high speed V2, a speed-torque characteristic comparable to that shown by curve C in Fig. 4 will be obtained. For this speed setting, the resistors 4, 5, 6 have such a value that a speed-torque performance as shown by curve D of Fig. 4 is obtained when reactor device SR is substantially fully saturated.

Fig. 5 illustrates the use of parallel resistors 44, 45, 46 in systems according to Fig. 3 (also Fig. 7), without the use of capacitors 67, 68, 69. When the reference voltage is set for a low speed V3, the speed-torque performance is comparable with that shown by curve E in Fig. 5. Curve F of Fig. 5 is the speed-torque curve obtained when the reactor device SR is unsaturated and hence carries minimum current. Here, the smallest torque which can be developed by the motor is somewhat smaller than T5, the minimum torque of the load. Curve F is determined by the value of resistors 44, 45, 46. Curve G of Fig. 5 is the speed-torque curve which would be obtained by resistors 4, 5, 6 when resistors 44, 45, 46 are disconnected and the reactor device SR is substantially saturated. Curve H is the speed-torque curve which would be obtained with resistors 44, 45, 46 connected, and with the saturable reactor device SR substantially saturated. When the reference voltage is adjusted for a high speed V2, a speed-torque performance as shown by curve J of Fig. 5 is obtained. Here, resistors 44, 45, 46 are adjusted to obtain a minimum torque curve K. Resistors 4, 5, 6 are adjusted for a speed-torque curve L, resulting in a composite curve N comparable to curve H of the low-speed adjustment.

Fig. 6 shows a set of curves comparable to those of Fig. 5, except that the capacitors 31, 32 and 33 are added to the system. Instead of curve F in Fig. 5, the minimum torque now is determined by curve P. This is the curve obtained when capacitors 67, 68, 69 and resistors 44, 45, 46 are effective and the saturable reactor device SR is carrying minimum current through windings 1, 2 and 3. Curve Q represents the speed-torque performance which would be obtained by the capacitors 67, 68, 69 alone. Curve R would be obtained by resistors 44, 45, 46 alone. Curve S would be obtained by resistors 4, 5, 6 alone. Curve U is the speed-torque curve obtained by the complete system with the reactor device SR essentially saturated.

In comparing the performance of the systems represented by the diagrams of Figs. 6 and 5, it will be noticed that the starting torque T8 developed according to Fig. 6 is considerably greater than the starting torque T8 obtained in the system performing in accordance with Fig. 5. This increase is due to the presence of the capacitors. It will further be observed that for overload conditions, the parallel resistors 44, 45, 46 and the capacitors 67, 68, 69 support a larger percentage of the overload and, therefore, tend to maintain a better power factor of the motor for these overload conditions. In Fig. 6, for instance, the torque T10 at blocked rotor is almost equal to the rated torque T4. Thus, at stall, the motor develops full torque with very little current through reactor windings 1, 2 and 3.

Figure 7:
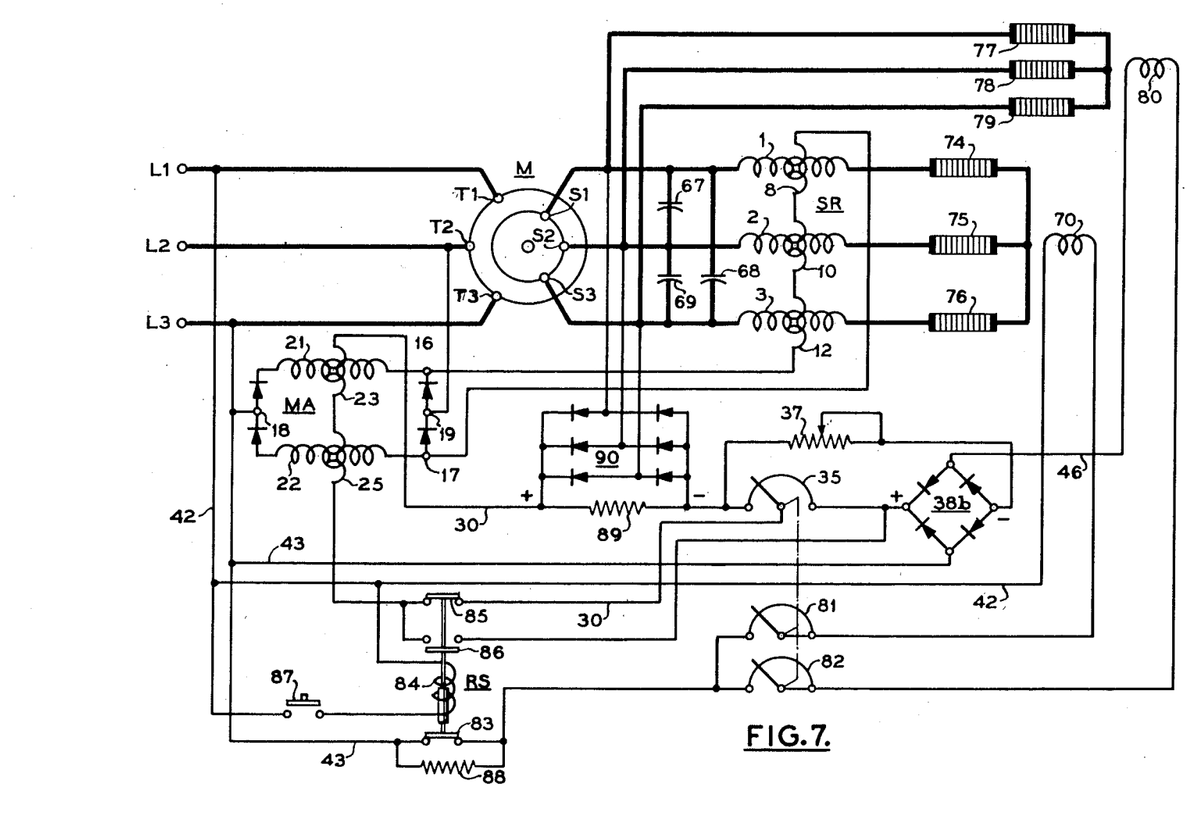
Fig. 7 shows a control system equipped with carbon-pile resistors in the rotor circuit.

The control system shown in Fig. 7 is largely similar to the one described above in reference to Fig. 3, and also affords a performance as exemplified by the speed-torque diagrams of Figs. 4 to 6. However, the system of Fig. 7 differs from those previously described mainly in two essential respects. In the first place, the correlation between the speed-control potentiometer 35 in the control circuit of the amplifier MA and the variable resistors in the rotor circuit is established by electromagnetic means. Secondly, the condition-responsive signal voltage in the amplifier control circuit is supplied not from a tachometer generator but is derived electrically from the secondary terminals so as to be proportional to the slip-ring voltage of the motor. As regards the latter feature, the system in Fig. 7 also embodies an invention more fully described, and claimed, in my copending application, Serial No. 554,864, filed Dec. 22, 1955, for Induction Motor Control Systems, assigned to the assignee of the present invention.

As shown in Fig. 7, the three load resistors 74, 75, 76 in series with the reactor main windings 1, 2, 3 of the secondary circuit consist of carbon piles whose effective ohmic resistance is controlled by a magnet coil 70. Similarly, the resistors 77, 78, 79, connected to motor secondary terminals S1, S2, S3 in shunt relation to the saturable reactor device SR, also consist of carbon piles whose resistance is controlled by a magnet coil 80. The two three-phase resistor devices of the carbon-pile type are of conventional design. Their resistance decreases with increasing excitation current in the respective windings 70 and 80, because this current causes compression of the respective piles with the effect of reducing resistance.

The two resistance control windings 70 and 80 are energized from line terminals L1 and L3 through respective alternating-current leads 42, 43 under control by two adjustable rheostats 81 and 82 respectively. The connection between lead 43 and rheostats 81, 82 extends through the normally closed contact 83 of a relay RS whose control coil 84 also actuates a normally closed contact 85 in the control circuit 30 of amplifier MA, and a normally open contact 86 for switching the speed-control potentiometer 35 in the amplifier control circuit 30 to maximum reference voltage. The coil 84 of relay RS is energized from leads 42, 43 under control by a normally open push-button switch 87. As shown, a resistor 88 of high resistance as compared with the resistance of rheostats 81, 82 may be connected across the contact 83. It will be noted that the opening of contact 83 has the effect of reducing the voltage of windings 70 and 80 to zero or to a minimum in order to set the carbon-pile resistors to high resistance as required for minimum operating speed of the motor.

As mentioned, the amplifier control circuit in the system of Fig. 7 differs from those of the systems described previously, in that the signal voltage is taken from the secondary terminals of the motor and is proportional to the slip-ring voltage. This is done by connecting a resistor 89 across the output terminals of a three-phase full-wave rectifier 90 which has its input terminals connected to the motor secondary terminals S1, S2, S3. The connection is similar to that of resistor 39 and rectifier 40b in Fig. 3, except that in the system of Fig. 7, the direct-current voltage impressed across the resistor 89 is the only variable signal voltage effective in amplifier control circuit 30 in series opposition to the adjusted constant reference voltage from control potentiometer 35. By virtue of the fact that the saturable reactor windings 1, 2, 3 are connected in the rotor circuit so that the primary terminal voltage impressed upon the stator of motor M remains constant, the rotating magnetic field of motor M has a constant magnitude. Therefore, the voltage appearing across the secondary terminals S1, S2, S3, is substantially proportional to the slip of the motor, and the speed of the motor can be held approximately constant by holding the rotor voltage constant. This is accomplished as follows.

When the rotor voltage at terminals S1, S2, S3 is smaller than the value regulated, the voltage appearing across resistor 89 is smaller than the voltage across the tapped-off portion of control potentiometer 35. This causes a current flow through the control circuit 30 which magnetizes the control coils 23, 25 in such a direction as to reduce the degree of saturation of the iron cores in the magnetic amplifier MA. This increases the effective impedance of amplifier windings 21, 22 so that the rectified current flowing between the amplifier output terminals 16, 17 and through the reactor control coils 8, 10, 12 of device SR is correspondingly small. Hence, the effective impedance of reactor main windings 1, 2, 3 is large, causing the load current flowing through the windings 1, 2, 3 to be relatively small. Under this condition, the motor cannot develop enough torque to support the load. The motor slows down.

On the other hand, when the motor terminal voltage is greater than the value regulated, the voltage appearing across resistor 89 is greater than the reference voltage from control potentiometer 35. This causes a current flow through control circuit 30 of the magnetic amplifier MA in the reverse direction so that the reactor cores of the amplifier are increasingly saturated and reduce the effective impedance of windings 21 and 22. Now, a larger current passes between amplifier output terminals 16, 17 through the control coils 8, 10, 12 of reactor device SR. This, in turn, causes a large current to flow through the reactor main windings 1, 2, 3. Consequently, the motor develops more torque than is required to drive the load, and the motor accelerates.

Actually, the speed at which the motor runs continuously is such that the voltage appearing across the resistor 89 is slightly greater than the voltage appearing across the tapped-off portion of control potentiometer 35, the difference being equal to the voltage drop across the control coils 23, 25 of amplifier MA.

The regulating performance just described is effective during normal operation with the result of then running the motor M at the desired speed set by means of the control potentiometer 35. The potentiometer 35 is linked with the control rheostats 81 and 82 so that any change in setting of potentiometer 35 is simultaneously effective to also change the resistance value of the resistors 74 to 79 in the secondary circuit of the motor.

During the normal operations described above, the relay RS is in the illustrated inactive condition. For inching operations at very low speed, the "inch" button 87 is to be kept depressed for the period of time during which the slow-speed operation is to be effective. The contact 87 then energizes the coil 84 of relay RS. Relay contacts 83 and 85 are opened and relay contact 86 is closed. Contact 86 now inserts the full resistance of speed control potentiometer 35 into the control circuit 30 of amplifier MA, thus setting the amplifier for operation at slower speed at which the motor has a high degree of slip and thus causes a correspondingly high voltage to be effective across the resistor 89. Simultaneously, the opening of contact 83 decreases or eliminates the current flowing through the control coils 70 and 80, thus also adjusting the resistors 74 to 79 to the increased resistance value most appropriate for the slow operating speed. When the operator releases the "inch" button 87, the system is reset for operation at the speed selected by the control potentiometer 35.

Figure 8:
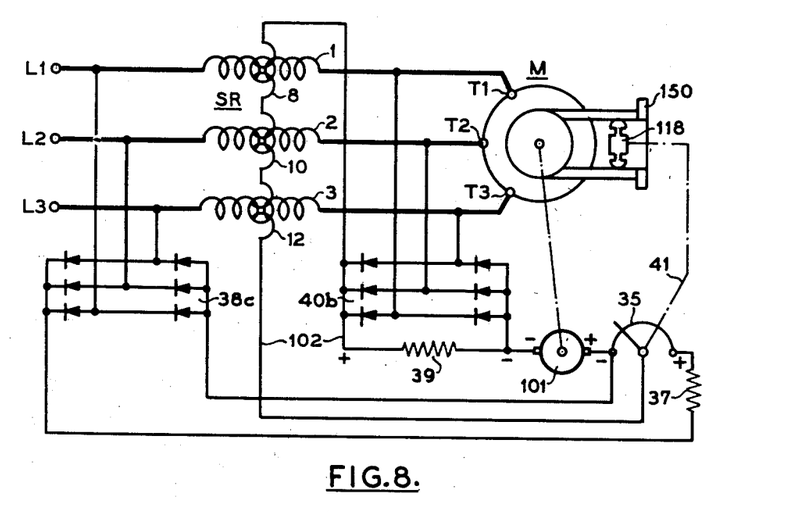
Fig. 8 illustrates schematically a control system comprising an induction motor of the squirrel-cage type.

The motor control system shown in Fig. 8 is similar to that of Fig. 1 in that the saturable reactor device SR is connected in the primary circuit of a motor M to control the motor speed by varying the stator terminal voltage at terminals T1, T2, T3. However, the system of Fig. 8 differs from those previously described by operating with an induction motor generally of the squirrel-cage type but designed to permit a change in rotor resistance. While such a reactor-controlled squirrel-cage motor may be provided with any of the reactor control circuits responsive to a speed-responsive voltage, the system of Fig. 8 is equipped with a tachometer generator 101 driven from the rotor of motor M to provide speed-proportional intelligence voltage.

The effective impedance of device SR, and hence the power supply to the motor M, is controlled by the current supplied to the saturation control coils 8, 10, 12. Coils 8, 10 and 12 are connected in a control circuit 102 which includes two series-opposed main sources of control voltage. One of these sources is constituted by the tachometer generator 101. The other source consists of the tapped-off portion of the control potentiometer 35. Potentiometer 35 is energized in series with a resistor 37 by constant direct voltage from a full-wave rectifier 38c connected across line terminals L1, L2, L3. The control circuit 102 also includes a resistor 39 connected across the output terminals of a rectifier 40b energized from the motor terminals T1, T2, T3. The resistor 39 merely supplies a stabilizing voltage with the effect explained above with reference to resistor 39 and rectifier 40b in the system illustrated in Fig. 3.

As long as the speed of motor M is in accordance with the value determined by the selected slider setting of potentiometer 35, the algebraic sum of the voltages effective in the control circuit 102 is approximately zero. However, when the motor speed departs from the correct value, the sum of the voltages in control circuit 102 assumes a corresponding positive or negative value depending upon whether the motor speed is higher or lower than the value selected by the setting of potentiometer 35. As a result, a current passes through reactor control coils 8, 10, 12 in the direction and of the magnitude required to reestablish the correct motor speed.

In order to adapt the resistance of the squirrel-cage rotor to the selected speed setting of potentiometer 35, the motor M is equipped with a displaceable control assembly which is ganged-up with the slider of potentiometer 35 as is schematically indicated in Fig. 8 by the dot-and-dash line 41. Details of the motor and its slider assembly are apparent from Fig. 9, and will be described presently.

Figure 9:
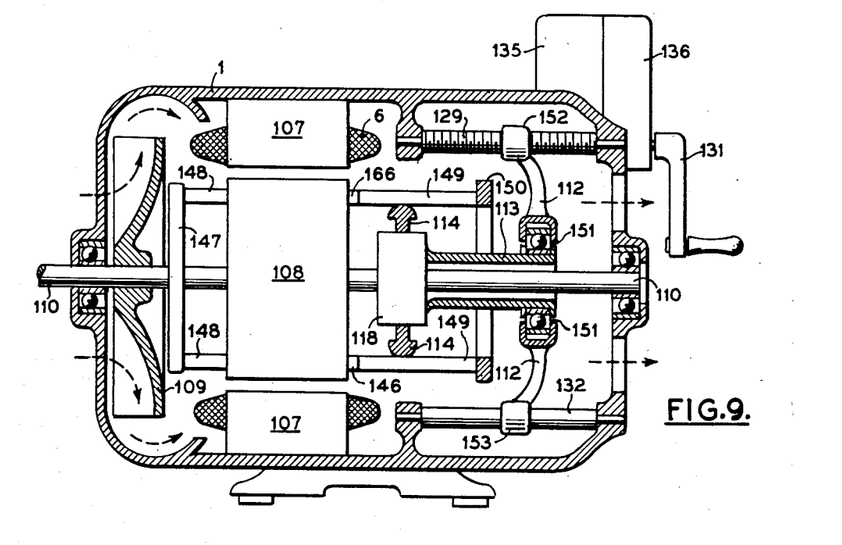
Fig. 9 shows a longitudinal, sectional view of a squirrel-cage motor applicable in the system of Fig. 8.

The stator 107 of the motor is of standard construction. The rotor 108 is of special construction as far as the rotor bar assembly is concerned. Ventilation of the motor is obtained by means of a centrifugal fan 109. Such a fan is applicable when the motor is to run at approximately constant speed. If the particular use to which the motor is to be put requires continuous operation at low speeds, a separately driven blower for forced air-cooling should be provided.

The rotor bar assembly shown in Fig. 9 comprises pairs of conductor bars 148 and 149 which extend through the rotor 108 and are joined together on the air intake side by a conductor ring 147 and on the air outlet side by a ring 150. Each two bars 148 and 149 are rigidly joined together at junction 146 by brazing or welding. Ring 147 and rotor bar portions 148 consist of a material of high electric conductivity. Rotor bar portions 149 and ring 150 are made of resistance material. This particular design assures that most of the heating in the rotor circuit occurs in bars 149 and ring 150, which are located on the air outlet side of the motor.

In order to vary the resistance of the rotor bar assembly, a slider assembly 118 is provided. This assembly can be moved axially along the motor shaft 110 by means of a crank 131. The effective resistance of the rotor circuit is thus mostly determined by the distance between junction 146 and the point at which a shoe 114 of the slider assembly is in contact with the adjacent rotor bar 149. The contact shoes 114 press against the respective bars 149 by centrifugal force when the rotor is rotating; or they may be pressed against the rotor bars by spring action if the motor is to have a large range of speeds. All contact shoes 114 of the slider assembly 118 are electrically connected together, for instance by braided copper conductors. The shoes 114 and the connecting conductor are of high-conductivity material. The pressure with which the shoes bear against the bars 149 must be adequate to minimize contact resistance to permit effective short-circuiting of bars 149 at the point of shoe contact.

The assembly 118 is rigidly mounted on a sleeve 113 which rotates together with the shaft 110. The sleeve 113 is rigidly connected to the inner race of a bearing 151. The inner race rotates together with shaft 110. The outer race of bearing 151 is housed in a control arm 112. The arrangement is such that the assembly 118 and the sleeve 113 may rotate while the control arm 112 is stationary. As control arm 112 is moved axially along shaft 110, the slider assembly 118 moves the same amount.

A crank 131 is connected with a worm spindle 129 meshing with a threaded portion 152 of control arm 112. Another portion 153 of control arm 112 is in slidable engagement with a guide pin 132. Rotation of crank 131 causes the slider assembly 118 to move along shaft 110, thus permitting a stepless variation in resistance of the rotor bar assembly.

Mounted on the housing of the motor is a casing 136 which encloses a step-down gear joined with the movable slider of the speed-control potentiometer. This potentiometer, denoted by 35 in Fig. 8, is located within a portion 135 of casing 136.

It will be recognized that any selected adjustment of the slider assembly 118 effected by rotation of crank 131 corresponds to the selected speed setting of the controlling rheostate. Reverting to Fig. 8, therefore, it will be recognized that the control components illustrated in Fig. 9 are operative to provide for the correlation of speed setting and rotor resistance schematically indicated in Fig. 8 by the connection 41.

As manifested by the variety of embodiments described in the foregoing, the invention is amenable to a great diversity of modifications and may be embodied in systems and with the aid of components other than those specifically illustrated and described, without departing from the essential features of the invention and within the scope of the claims annexed hereto.

I claim:

1. An alternating-current motor control system, comprising an induction motor having a stator circuit and a rotor circuit, said rotor circuit having continuously variable resistance means, an inductive impedance device of continuously variable effective impedance connected in series with one of said circuits, said device having control means comprising a selectively adjustable member for varying said impedance in accordance with a desired motor speed, and means connecting said member with said resistance means for varying the rotor-circuit resistance in dependence upon, and in the same sense as, said desired speed, each speed setting of said member corresponding to a different resistance setting of said resistance means.

2. An alternating-current motor control system, comprising an induction motor having a stator circuit and a rotor circuit, a variable inductive impedance device connected in series with one of said circuits and having voltage-responsive impedance control means, variable-voltage supply means connected with said impedance control means for varying the impedance of said device to maintain a desired motor speed, variable resistor means connected in said rotor circuit and having resistance control means, and means connecting said resistance control means with said voltage supply means for changing the resistance of said resistor means in a given dependence upon, and in the same sense as, said speed, each selected voltage setting of said voltage supply means corresponding to a different resistance setting of said resistor means.

3. An alternating-current motor control system, comprising an induction motor having a stator circuit and a rotor circuit, said rotor circuit having continuously variable resistance means, an inductive impedance device of continuously variable effective impedance connected in series with one of said circuits, said device having control means comprising a selectively adjustable member for varying said impedance in accordance with a desired motor speed, and means connecting said member with said resistance means for varying the rotor-circuit resistance in dependence upon, and in the same sense as, said desired speed, said resistance having for each speed setting of said member a magnitude approximately equal but slightly below the value R according to the equation:

$$R=\frac{\left[\frac{N}{N_s}-\left(\frac{N}{N_s}\right)^2\right]E_b^2}{P_o}$$

wherein $N_s$ denotes the synchronous speed, $N$ the actual speed, $P_o$ the rated power output and $E_b$ the blocked rotor voltage.

4. An alternating-current motor control system, comprising an induction motor having a stator circuit and a rotor circuit, said rotor circuit having continuously variable resistance means, a saturable reactor device connected in series with said stator circuit and having saturation control coils, voltage supply means connected with said control coils and having a selectively and continuously adjustable member for varying the impedance of said device in accordance with a desired motor speed, and means connecting said member with said resistance means of said rotor circuit, said resistance means having due to said connecting means a different resistance for each different speed setting of said member.

5. An alternating-current motor control system, comprising a wound-rotor motor having a stator circuit and having an external rotor circuit, a saturable reactor device connected in series with said stator circuit and having saturation control coils, controllable resistor means connected in series with said rotor circuit, voltage supply means connected with said control coils and having a selectively adjustable member for varying the impedance of said device in accordance with a desired motor speed, means connecting said member with said resistor means for varying the resistance thereof in dependence upon said desired speed, said resistance having for each speed setting of said member a magnitude approximately equal but slightly below the value R according to the equation:

$$R = \frac{\left[\frac{N}{N_s} - \left(\frac{N}{N_s}\right)^2\right] E_b^2}{P_o}$$

wherein $N_s$ denotes the synchronous speed, $N$ the actual speed, $P_o$ the rated power output and $E_b$ the blocked rotor voltage.

6. In a motor control system according to claim 4, said motor being of the squirrel-cage type and having rotor bars provided with resistive portions and a slider assembly engaging said portions and being displaceable relative thereto for varying the rotor resistance, and said connecting means being linked with said slider assembly for controlling its position in dependence upon the selected adjustment of said member.

7. An alternating-current motor control system, comprising a wound-rotor motor having a stator circuit and having an external rotor circuit, a saturable reactor device having reactor main windings connected in series with said rotor circuit and having reactor control coils for varying the effective impedance of said windings, load resistors of substantially continuously variable resistance connected in said rotor circuit in series with said reactor main windings and having displaceable resistance adjusting means, speed control means connected with said reactor control coils for varying said impedance to substantially maintain a desired motor speed, said speed control means having a continuously movable adjusting member for selecting said desired speed, and said member being connected with said adjusting means for effecting a variation of said resistance for each change in speed adjustment of said member.

8. An alternating-current motor control system, comprising a wound-rotor motor having a stator circuit and having an external rotor circuit, a saturable reactor device having reactor main windings connected in series with said rotor circuit and having reactor control coils for varying the effective impedance of said windings, speed control means connected with said reactor control coils for varying said impedance to substantially maintain a desired motor speed, variable resistors connected with said rotor circuit in shunt relation to said reactor main windings for by-passing part of the rotor current, and means connecting said resistors with said speed control means whereby the resistance of said resistors is changed in dependence upon change of said desired speed.

9. In a motor control system according to claim 8, said resistance having for each speed setting of said member a magnitude approximately equal but slightly below the value R according to the equation:

$$R = \frac{\left[\frac{N}{N_s} - \left(\frac{N}{N_s}\right)^2\right] E_b^2}{P_o}$$

wherein $N_s$ denotes the synchronous speed, $N$ the actual speed, $P_o$ the rated power output and $E_b$ the blocked rotor voltage.

10. An alternating-current motor control system, comprising a wound-rotor motor having a stator circuit and a rotor circuit, a saturable reactor device having reactor main windings connected in series with said rotor circuit and having reactor control coils, speed control means connected with said reactor control coils for varying the reactance of said device to substantially maintain a desired motor speed, said speed control means having an adjustable member for selecting said desired speed, controllable load resistors connected in said rotor circuit in series with said reactor main windings, controllable shunt resistors connected with said rotor circuit in parallel relation to said reactor device for by-passing part of the rotor current, and means connecting said speed control means with said load resistors and said shunt resistors for varying the effective resistance of said load resistors and of said shunt resistors in dependence upon the selected speed setting of said adjustable member.

11. An alternating-current motor control system, comprising an induction motor having a stator circuit and a rotor circuit, a saturable reactor device connected in series with one of said circuits and having saturation control means, voltage supply means connected with said saturation control means and having a source of adjustable constant reference voltage and a source of condition-responsive signal voltage opposed to said reference voltage as regards its effect upon said saturation control means, resistors connected in said rotor circuit, resistance control means connected with said resistors for increasing, when actuated, the resistance of said resistors to a given high value, selectively operable trip means connected with said resistance control means and also connected with said source of reference voltage for switching, when operative, said reference voltage to a low-speed value and simultaneously actuating said resistance control means.

12. An alternating-current motor control system, comprising an induction motor having a stator circuit and a rotor circuit, a saturable reactor device connected in series with one of said circuits and having saturation control means, voltage supply means connected with said saturation control means and having a source of adjustable constant reference voltage and a source of condition-responsive signal voltage opposed to said reference voltage as regards its effect upon said saturation control means, variable resistor means connected in said rotor circuit and having resistance control means, means connecting said resistance control means with said reference-voltage source for changing the resistance of said resistor means in dependence upon change in adjustment of said reference voltage, a contactor having contact means movable between two positions and connected across a normally ineffective portion of said resistor means when in one of said positions so as to place maximum resistance of said resistor means into said rotor circuit when in said other position, and selectively actuable switch means connected with said contactor for causing it to move said contact means to said other position, and further contact means connected with said source of reference voltage for switching said reference voltage to a low-speed value when said contact means of said contactor are in said other position.

13. A control system according to claim 10, comprising contactor means movable between two positions and having respective contacts connected across a normally ineffective portion of each of said load resistors and shunt resistors so as to increase the effective resistance of each of said resistors to a given value when said contactor means is in said other position, and a control switch connected with said contactor means for causing it to occupy said other position, and means connecting said switch with said source of reference voltage for switching said reference voltage to a low-speed value when said contactor means is in said other position.

14. A motor control system, comprising a wound-rotor motor having primary terminals and secondary terminals, alternating-current supply means having constant voltage connected to said primary terminals, an impedance load circuit connected between said secondary terminals, adjustable load resistors, a saturable reactor device having main windings connected in said load circuit in series with said respective resistors, said reactor device having control coils for varying the effective reactance of said main windings in said load circuit, a mixer device having two input circuits and a mixer output circuit, circuit means connecting one of said input circuits across said secondary terminals to supply to said mixer a speed responsive-signal voltage, a source of constant voltage and an adjustable speed control rheostat forming part of said other input circuit to provide a selected speed reference voltage, said signal voltage and said reference voltage being opposingly poled as regards their effect upon said mixer output voltage to impress a resultant error voltage thereupon, an amplifier having input terminals connected with said mixer output circuit and having output terminals connected to said control coils for applying amplified error voltage thereto, and connecting means operatively joining said load resistors with said speed control rheostat for varying the resistance of said resistors in said load circuit in dependence upon the selected setting of said rheostat.

15. A motor control system, comprising an induction motor having a rotor circuit, variable impedance means connected in said rotor circuit and comprising a saturable reactor and a controllable resistor connected in series with each other, said reactor having a saturation control circuit for varying the effective reactance of said reactor, two voltage supply means connected with said control circuit in differential relation to each other, one of said voltage supply means having an adjustable control member for providing selected constant reference voltage, said other voltage supply means having a variable voltage responsive to the motor speed whereby the speed of said motor is regulated to a value dependent upon said reference voltage, and said resistor having control means for varying the resistance of said resistor in response to changes of said value.

16. A motor control system, comprising a wound-rotor motor having a primary circuit of substantially constant terminal voltage and having secondary terminals, a load circuit connected to said secondary terminals, a variable impedance device connected in said load circuit and having control means for varying the impedance in said load circuit, a voltage-responsive mixer device having an output circuit connected with said control means and having two input-voltage means poled in differential relation to each other, one of said voltage means having a constant voltage source and voltage adjusting means for providing a selected reference voltage, said other voltage means being connected across said secondary terminals to provide a variable voltage dependent upon the secondary voltage of said motor, a variable resistor connected in said load circuit in series with said impedance device and having resistance control means connected with said voltage adjusting means, whereby the resistance of said resistor is changed in a given relation to the change of said reference voltage.

No references cited.